F. C. WARNE.
CULTIVATOR.
APPLICATION FILED NOV. 15, 1911.
1,107,390.
Patented Aug. 18, 1914.
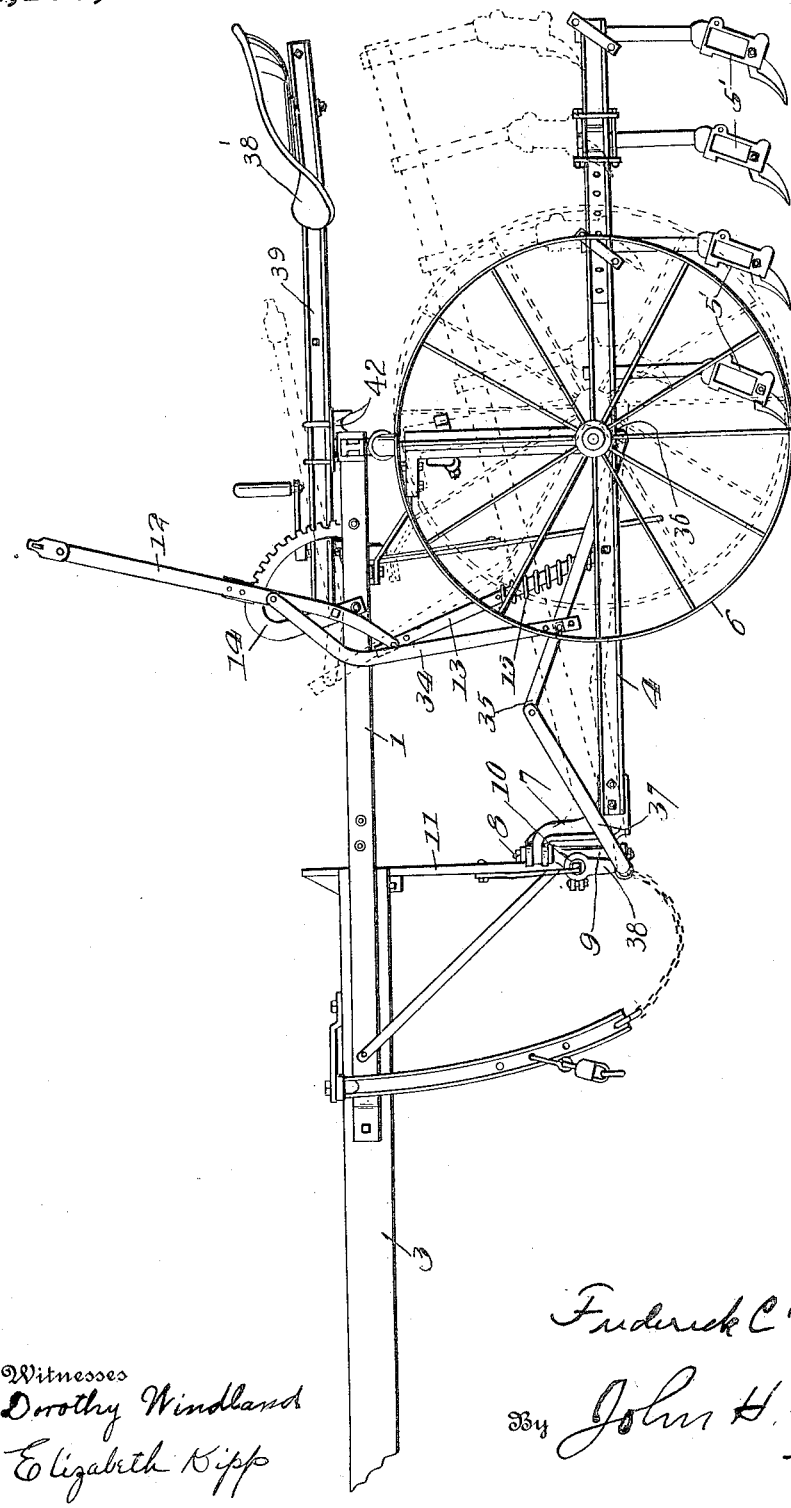
Witnesses
Dorothy Windland
Elizabeth Kipp
Inventor
Frederick C. Warne
By John H. Boss
his Attorney

UNITED STATES PATENT OFFICE.

FREDERICK C. WARNE, OF MANSFIELD, OHIO, ASSIGNOR TO THE RODERICK LEAN MANUFACTURING COMPANY, OF MANSFIELD, OHIO, A CORPORATION OF OHIO.

CULTIVATOR.

1,107,390. Specification of Letters Patent. Patented Aug. 18, 1914.

Application filed November 15, 1911. Serial No. 660,463.

*To all whom it may concern:*

Be it known that I, FREDERICK C. WARNE, a citizen of the United States of America, residing at Mansfield, in the county of Richland and State of Ohio, have invented certain new and useful Improvements in Cultivators, of which the following is a specification.

This invention relates to cultivators, and the primary object thereof is to provide new, novel, improved and simplified means for effecting raising or lowering of pivoted shovel-carrying beams, and simultaneously therewith moving the ground engaging wheels backward or forward.

A structural embodiment of the invention is shown in the drawings, wherein, the figure is a side elevation of a cultivator, shown in fragment, to which the present invention is applied.

The cultivator is shown as having the usual side rails 1, a draft pole 3, and a frame 39 which carries the seat 38' for the driver.

The beams 4 carry the shovels 5', and have couplings 7 at their inner ends which receive bolts 8, and further have other couplings 9 which are rotatable upon horizontal pintles 10, suitably connected to a yoke 11 which is secured to the pole 3, which aforementioned parts allow the beams to have horizontal and also vertical movement at their rear or free ends.

To effect vertical movement of the beams 4, levers 12 are provided, which levers are pivoted intermediate their ends to the rails 1, and are held in adjusted position by a pawl and ratchet mechanism 14. A presser bar or a yielding link 13, is pivoted to the lower end of the lever 12, and is encircled by a coil spring 15, which latter exerts pressure downwardly upon the beams, the bar or link 13 being connected to the beam 4, in any suitable manner, the spring 15 acting to force the shovels toward the ground.

The couplings 9 are provided with lugs 38 to which the front members 37 of toggles are pivoted, the rear members 35 of the toggles being pivoted to lugs 36 which are in connection with the yoke 31 which carries the ground engaging wheels 6. The yoke 31 is pivotally connected to the side rails 1 and is capable of being swung from the dotted to the full line position shown in the drawings, and vice versa. Links 34 have their lower ends adjustably connected to the members 35 of the toggles, and have their upper ends curved toward the levers 12, and pivoted to the latter at a point above the pivotal points of the levers 12.

In operation, when lever 12 is moved toward the seat, the link 34 will be lowered thereby extending the toggle with the result that the beams 4 will be raised, and the ground wheels 6 moved rearwardly to the position shown in dotted lines in the drawings. When the lever is moved to the full line position, the link 34 will be raised thereby moving the wheels 6 forwardly and the beams 4 downwardly, the action of the parts being such as to effect counterbalancing of one another.

What I claim is:

1. In combination with a frame having a ground wheel carrying yoke pivotally connected thereto, and a shovel beam in pivotal connection with said frame, a toggle connected at one end to the yoke, means to connect the opposite end of the toggle to the frame, a link pivoted at one end to the toggle, a lever pivoted intermediate its end to the frame, said link having its upper end angularly disposed and pivoted to said lever above the pivotal point of the latter, and a yielding link between the lower end of the lever and said beam which link is pivoted to the lower end of the lever and is connected to said beam whereby upon movement of the lever in one direction the beam will be lowered and the yoke moved forwardly.

2. In combination with a frame having a ground wheel carrying yoke pivotally connected thereto, and a shovel beam in pivotal connection with said frame, a toggle connected at one end to the yoke, means to connect the opposite end of the toggle to the frame, a lever pivoted intermediate its ends to the frame, a connection between the toggle and the lever connected to the lever at a point above the pivotal point of the lever to move the yoke backwardly and forwardly, and a yielding device between the lower end of the lever and said beam which device is connected to the lower end of the lever and to said beam whereby to raise and lower said beam through said device when the lever is given movement.

In testimony whereof I affix my signature in presence of two witnesses.

FREDERICK C. WARNE.

Witnesses:
JOHN H. COSS,
DOROTHY WENDLAND.

Copies of this patent may be obtained for five cents each, by addressing the "Commissioner of Patents, Washington, D. C."